United States Patent [19]

Sandreid

[11] Patent Number: 4,669,582

[45] Date of Patent: Jun. 2, 1987

[54] GRIPPING DEVICE FOR RELEASABLY GRIPPING A ROPE, WIRE OR SIMILAR ELONGATED FLEXIBLE MEMBER

[75] Inventor: Alf J. Sandreid, Copenhagen, Denmark

[73] Assignee: Sophus Berendsen Marine A/S, Copenhagen, Denmark

[21] Appl. No.: 780,326

[22] Filed: Sep. 26, 1985

[30] Foreign Application Priority Data

Sep. 26, 1984 [DK] Denmark .............................. 4612/84

[51] Int. Cl.⁴ ........................ F16G 11/10; B25B 25/00
[52] U.S. Cl. .............................. 188/65.1; 24/132 WL; 24/134 L; 254/250; 254/256
[58] Field of Search ................ 254/243, 250, 251, 252, 254/253, 254, 255, 264, 384; 188/65.1; 24/132 WL, 134 KB, 134 L, 136 L; 294/75, 104, 902

[56] References Cited

U.S. PATENT DOCUMENTS

| | | | |
|---|---|---|---|
| 3,410,525 | 11/1968 | Tanson ............................. | 294/104 X |
| 3,528,139 | 9/1970 | Desplats .......................... | 254/264 X |
| 3,824,653 | 7/1974 | Sholler ............................ | 254/251 X |
| 3,863,893 | 2/1975 | Cavalieri ......................... | 254/254 X |
| 3,886,631 | 6/1975 | Caradot ........................... | 254/264 X |
| 4,106,753 | 8/1978 | Cavalieri et al. ............... | 188/65.1 X |
| 4,480,816 | 11/1984 | Gortan ............................. | 254/264 |
| 4,483,517 | 11/1984 | Cavalieri ......................... | 254/254 |

FOREIGN PATENT DOCUMENTS

| | | |
|---|---|---|
| 64571 | 11/1982 | European Pat. Off. . |
| 92455 | 10/1983 | European Pat. Off. . |
| 1228696 | 8/1960 | France .............................. 188/65.1 |
| 1489029 | 7/1967 | France . |
| 18665 | 3/1904 | Sweden . |

1005845 9/1965 United Kingdom ................ 254/254

Primary Examiner—Stuart S. Levy
Assistant Examiner—Joseph J. Hail, III
Attorney, Agent, or Firm—Dennison, Meserole, Pollack & Scheiner

[57] ABSTRACT

A device for gripping or locking a rope or wire comprises a pair of rope engaging members or jaw members defining a pair of oppositely arranged wire engaging surfaces forming a passageway for the rope. The jaw members are mounted in the frame of the gripping device by means of a swinging link suspension including a pair of swinging links. The jaw members are suspended so that the frictional forces acting between the rope and the jaw members cause displacement of the rope engaging surfaces thereon in mutual parallel relationship towards each other, when a pulling force is applied to the rope in a first direction, while the rope engaging surfaces are displaced away from each other, when a pulling force is applied to the rope or wire in a second opposite direction. This means that the rope is pinched between the rope engaging surfaces, when the rope is pulled in the said first direction, and released, when pulled in said second direction. The jaw members may comprise a first jaw member having a U-shaped cross-section with an inner bottom surface defining a first rope engaging surface, and a second jaw member displaceably received within the first jaw member. Corresponding swinging links suspending said first and second jaw members may be mounted pivotally about a common axis and define an angle therebetween, and these swinging members are preferably formed as an integral part. The jaw members may be moved to a rope releasing position by means of an operating handle.

5 Claims, 6 Drawing Figures

GRIPPING DEVICE FOR RELEASABLY GRIPPING A ROPE, WIRE OR SIMILAR ELONGATED FLEXIBLE MEMBER

BACKGROUND OF THE INVENTION

1. Field of the Invention

The present invention relates to a rope or wire gripping device for releasably gripping a rope, a wire, or a similar elongated flexible member, said device comprising a frame and a pair of spaced rope engaging members or jaw members, which have a pair of oppositely arranged, generally parallelly extending rope engaging surfaces defining therebetween a passageway for said rope or wire, and which are mounted in said frame so as to be movable in relation to each other and so that a force applied to said rope engaging surfaces and acting in one direction of said rope passageway will tend to move the rope engaging members closer to each other towards a locking position, while a force applied to the rope engaging surfaces and acting in the opposite direction of the rope passageway will tend to increase the spacing of the rope engaging surfaces and to move the rope engaging members towards a releasing position.

Such gripping devices may, for example, be used on sailing ships and in other places, where it is desirable to releasably grip and hold a tensioned rope or wire. As an example, the gripping device of the above type may be used in connection with winches, tackles, and other rope pulling devices, which may, for example, be used for hauling in sails.

2. Description of Prior Art

One type of known rope gripping devices comprises a rope engaging member in the form of an eccentric with an operating handle, by means of which the eccentric may be swung between a rope engaging position in which the rope or wire is pinched between the eccentric and an oppositely arranged rope engaging surface, and a rope releasing position, in which the eccentric has been moved out of engagement with the rope or wire. When a gripping device of this known type is used for gripping and holding a highly tensioned rope or wire, the rope engaging surface defined by the eccentric must be pressed against the rope at a correspondingly high compressive force. As the convexly curved rope engaging surface of the eccentric which is normally serrated comes into engagement with a rather small area of the rope surface only, the specific pressure may be extremely high. Consequently, the rope or wire is exposed to heavy wear, and this is rather undesirable in view of the fact that quite often it is the same part of the rope or wire which is repeatedly brought into engagement with the rope engaging member or excentric.

U.S. Pat. No. 3,824,653 discloses a rope gripping or locking device of the above type and comprising oppositely arranged, parallelly extending rope engaging surfaces for releasably gripping and locking a rope or wire positioned therebetween. The rope engaging surfaces of this known device are defined on a wedge-shaped jaw member displaceably arranged in the frame of the device, and by a second jaw member mounted on the frame by means of parallel, swingable arms. In the known gripping device, the mutual distance between the rope engaging surfaces may be adapted to the thickness or diameter of the rope or wire by displacing the wedge-shaped jaw member in relation to the frame of the device. Otherwise, the wedge-shaped jaw member is fixed in relation to the frame during use of the gripping device. When a rope or wire is gripped or locked in the known gripping device by parallel displacing of the said second jaw member in relation to the fixed wedge-shaped jaw member the movement of the second jaw member has not only a component directed transversely to and towards the wedge-shaped jaw member, but also a component in a direction parallel to the longitudinal direction of the rope or wire. The components extending in the longitudinal direction of the rope ensures that a tensile force applied to the rope in the said direction will cause the rope engaging surfaces to be forced towards each other, whereby an advantageous self-locking effect is obtained. However, the said component of movement of the movable jaw member in the longitudinal direction of the rope in relation to the stationary wedge-shaped jaw member causes undesired wear of the wire or rope.

Other known rope or wire gripping devices (known for example from the European patent application published under No. 64,571, U.S. Pat. No. 3,886,631, French Pat. No. 1,489,029, and Swedish Pat. No. 18,665) comprise rope engaging members or jaw members, which may be pressed towards each other and directed into engagement with the rope or wire without any substantial component of movement in the longitudinal direction of the rope. However, these known gripping devices do not have the above mentioned desirable self-locking effect in response to tensile forces applied to the rope.

SUMMARY OF THE INVENTION

The present invention provides a gripping device of the above type, which may grip and hold a rope or wire transmitting high tensile forces without exposing the rope or wire to hard wear.

Thus, the present invention provides a gripping device for releasably gripping an elongated flexible member, such as a rope or wire, said device comprising a frame and a pair of spaced rope engaging members which have a pair of oppositely arranged, generally parallelly extending rope engaging surfaces defining therebetween a passageway for said rope or wire, and which are mounted in said frame so as to be movable in relation to each other and such that a force applied to said rope engaging surfaces and acting in one direction of said rope passageway will tend to move the rope engaging members closer to each other towards a locking positon, while a force applied to the rope engaging surfaces and acting in the opposite direction of the rope passageway will tend to increase the spacing of the rope engaging surfaces and to move the rope engaging members towards a releasing position, said rope engaging members being movable in relation to the frame by swinging about pivot axes which are spaced from and extend transversely to the rope passageway.

In the gripping device according to the invention both of the rope engaging surfaces are moved to their gripping or locking positions by swinging movements about the said pivot axis so that both of the rope engaging surfaces are displaced in relation to the frame while retaining their mutually parallel positions so that they obtain substantially the same component of movement in the longitudinal direction of the rope. This means that the device according to the invention has the desired self-locking effect, and because there is no substantial relative movement of the rope engaging surfaces in the longitudinal direction of the rope, the self-locking effect does not give rise to increased wear as in the known gripping devices of this type.

The pivot axes for both of the rope engaging members or jaw members may be positioned at opposite sides of the passageway defined by the rope engaging surfaces, and in that case each of the rope engaging members or jaw members may then, for example, be mounted by a swinging link suspension. In the preferred embodiment, however, the pivot axes for both of the rope engaging members or jaw members are located at the same side of the rope passageway, whereby a more compact structure may be obtained.

The swingable mounting of the rope engaging members may, for example, be obtained by guiding at least one of the rope engaging members along arc-shaped slots or tracks by means of pins or studs engaging therewith. These pins or studs may be formed on the jaw members and engage with slots or tracks formed in the frame of the device. Alternatively, the slots or tracks may be formed in the jaw members, while the pins or studs may be formed on the frame. In the preferred embodiment each of the rope engaging members or jaw members is mounted in the frame by means of pairs of parallelly extending swingable arms. Each of these swingable arms is then pivotally connected to the frame as well as to the respective jaw member about pivot axes extending transversely to the rope passageway. When the pivot connections between the frame and the swingable arms and between the swingable arms and the respective engaging member or jaw member define a parallelogram, and when the rope engaging surface of the jaw member extends substantially parallel to the two opposite sides of this parallelogram, the desired parallel displacement of the rope engaging surface may be obtained.

As an example, the rope engaging members or jaw members may be formed as oppositely arranged, mutually spaced, swinging link suspended plate- or rod-shaped elements, and both of the rope engaging surfaces may be substantially plane, or they may both have a concavely curved, trough-shaped cross-section. However, one of the rope engaging surfaces may, alternatively, have a concave, trough-shaped cross-section, while the other is substantially plane or has a convexly curved cross-section fitting into the concave cross-section of the other rope engaging surface.

As mentioned above, the swingable arms of both of the rope engaging surfaces are preferably arranged at the same side of the rope passageway, provided that swinging link suspensions are formed which cause relative parallel displacement of the rope engaging surfaces towards and away from each other when the arms are swung in one direction and the other, respectively. In the preferred embodiment, all of said pivot axes define a common plane extending substantially parallel with the direction of the rope passageway, and each of the swingable arms associated with one of the rope engaging members defines an acute angle with the corresponding swingable arm of the other rope engaging member. By this arrangement it is obtained that displacement of the rope engaging members or jaw members in one direction along the rope passageway causes such a different swinging movement of the swingable arms, that the rope engaging surfaces are moved towards each other, while a movement of the jaw members in the opposite direction causes the jaw members or rope engaging members to move away from each other.

In order to ensure the desired mutual position of corresponding swingable arms or links associated with the oppositely arranged engaging members or jaw members, such corresponding arms or links may be interconnected. The movement of the rope engaging surfaces towards each other to a locking position and away from each other to a releasing position may be obtained by suspending the rope engaging members or jaw members so that for a certain swinging movement they are displaced mutually parallelly in the same direction, but so that one of the jaw members is displaced a distance, which is greater or smaller than the displacement of the other jaw member in the said direction. In case the rope engaging members or jaw members are suspended by means of swingable arms or links which extend to the same side of the rope passage way defined by the rope engaging surfaces, these rope engaging surfaces may be caused to be displaced in opposite directions towards or away from each other when the swingable arms or links are swung in opposite directions. This may be obtained when, in the locking position of the rope engaging members, each of the swingable arms or links for one of the rope engaging members is positioned on one side of a plane comprising the axis of the pivotal connection between the respective swingable arm and the frame, and extending at right angles to the rope passageway, while the corresponding swingable arm for the other rope engaging member is positioned at the other side of said plane.

The mutually corresponding swingable arms or links associated with either of the oppositely arranged rope engaging members may be mounted on the frame so as to be swingable about respective pivot axes, provided that the pivot axis for each of the two rope engaging members or jaw members is located in the same or in parallel planes. In the preferred embodiment, however, each pair of mutually corresponding swingable arms or links associated with a respective rope engaging member is mounted in the frame so as to be swingable about a common pivot axis.

In the present specification and claims the expressions "swingable arm" and "swingable link" are also used to designate the line segment being vertical to and extending between the two associated pivot axes. In practice, however, such arms or links are in the form of structural elements, and when such corresponding arms or links are arranged swingably about a common pivot axis, such arms or links may advantageously be formed as a single integral part. This ensures that movement of one jaw member or rope engaging member also automatically causes movement of the other jaw members. An operating handle or another operating member for moving the jaw members between their rope releasing and their rope engaging positions may then be connected to any of the interconnected movable parts as it is most convenient.

In a preferred embodiment of the gripping device according to the invention one of the rope engaging members or jaw members defines a U-shaped channel therein having a bottom surface which defines one of the rope engaging surfaces, and a portion of the other rope engaging members or jaw members defining the other rope engaging surface may be received in said channel. The interengaging jaw members then define a rope passageway which is closed at all sides.

The gripping device may include spring means for biasing the rope engaging members towards their locking positions. This ensures that in their locking positions the rope engaging surfaces are always biased into engagement with the surface of the rope or wire, and by actuating of an operating handle or another operating member the rope engaging members or jaw members may be manually moved to their rope releasing positions against the biasing force of the spring means.

BRIEF DESCRIPTION OF THE DRAWINGS

The invention will now be further described with reference to the drawings, wherein

The locking or gripping device shown in the drawings comprises a frame 10 having a substantially U-shaped cross-section and being divided into a pair of similar frame parts 11 along a symmetry plane of the gripping device. The frame parts 11 are interconnected by means of screws or similar fastening means (not shown) passed through bores 12. In FIGS. 1, 3, 4, and 6 one frame part has been removed for illustrative purposes. The frame parts 11, which may be made from metal, are preferably made from plastics material by blow molding, and a reinforcing member 14 made from metal may be arranged in a botton wall 13 of the frame 10 and clamped between the frame parts 11. As shown in the drawings, the reinforcing member may have a stepped shape and may be received in complementarily shaped channels formed in the frame parts 11 as best shown in FIG. 5.

DESCRIPTION OF THE PREFERRED EMBODIMENTS

Figure 1:
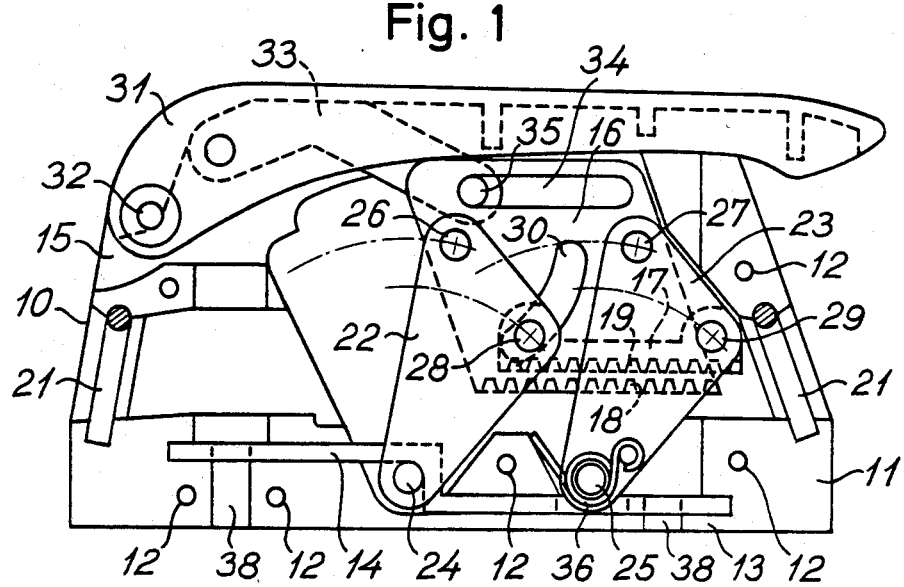
FIG. 1 is a side view of an embodiment of the gripping or locking device according to the invention, wherein a side plate has been removed, FIG. 2 diagrammatically illustrates the movement of the rope or wire engaging surfaces of the locking or gripping device.

A pair of rope or wire engaging members or jaw members 16 and 17 are mounted in the U-shaped frame between oppositely arranged, spaced side walls 15 thereof. One of the jaw members 16 has a U-shaped cross-section and is preferably made from plate metal. The upper side of the bottom wall of the jaw member 16 defines a substantially plane roughened rope engaging surface 18. The other rope engaging member or jaw member 17 is a plate-like member, which is received in the U-shaped jaw member 16, and a second, substantially plane, but roughened rope-engaging surface 19 is defined by the bottom surface of the plate member 17 arranged opposite to the rope engaging surface 18 so as to define a rope passageway between these rope engaging surfaces. Rope or wire 20 to be gripped and locked by the gripping or locking device may be passed through a pair of guide loops 21 arranged at opposite ends of the frame 10 and through the passageway defined between the rope engaging surfaces 18 and 19. The jaw members 16 and 17 are swingably mounted in relation to the frame 10 by means of a pair of substantially triangular swinging links or arms 22 and 23, each of which is swingably mounted around a pivot pin 24 and 25, respectively, mounted in the bottom wall 13 of the frame 10. The two pairs of swinging links or arms 22 and 23 are arranged at the outer side surfaces of the U-shaped rope engaging member or jaw member 16, and they are pivotally fastened to the upwardly extending side walls or flanges of this jaw member by means of pivot pins 26 and 27, respectively. The same swinging links or arms 22 and 23 are pivotally connected to the rope engaging member or jaw member 17 by means of pivot pins 28 and 29, and the pivot pin 28 extends through cutouts or openings 30 formed in the upwardly extending side walls or flanges of the rope engaging member or jaw member 16.

An operating handle 31 is swingably mounted between the side walls 15 of the frame 10 by means of a pivot pin 32, and the operating handle 31 is connected to the U-shaped jaw member 16 by means of a connecting link 33 having a tranversely extending stud or pin 35 at one end engaging with slots or cutouts 34 formed in the flanges of the jaw members 16 so as to form a lost motion connection between the connecting link 33 and the jaw member 16. The lost motion connection formed by the slots 34 and the stud 35 permits the operating handle 31 to be placed in the position shown in solid lines in FIGS. 1, 4, and 6 without preventing the desired movements of the rope engaging members or jaw members 16 and 17.

Figure 3:
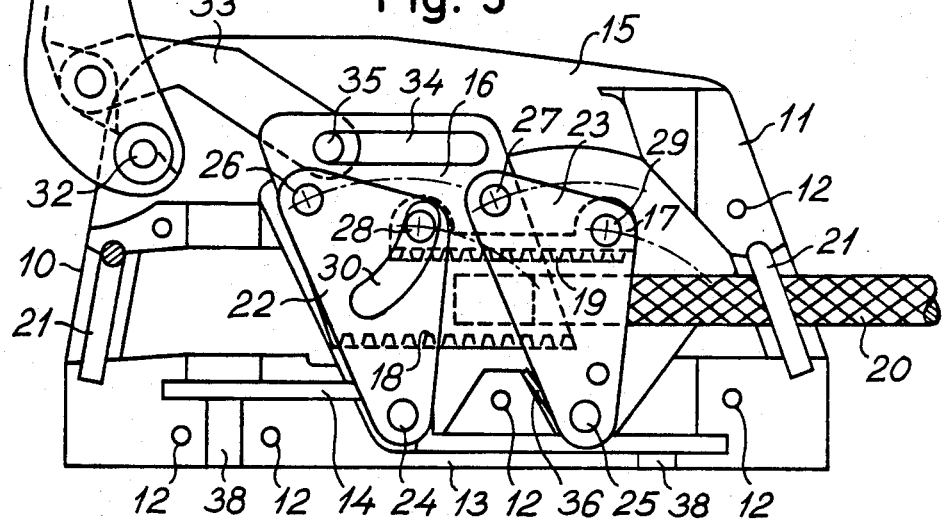
FIG. 3 is a side view corresponding to that shown in FIG. 1, but the gripping device is shown in its rope releasing position, while one end of a rope is being passed through the rope passageway defined therein.
Figure 5:
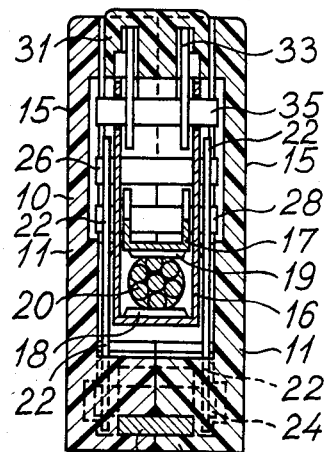
FIG. 5 is a sectional view along the line V—V in FIG, 4.
Figure 4:
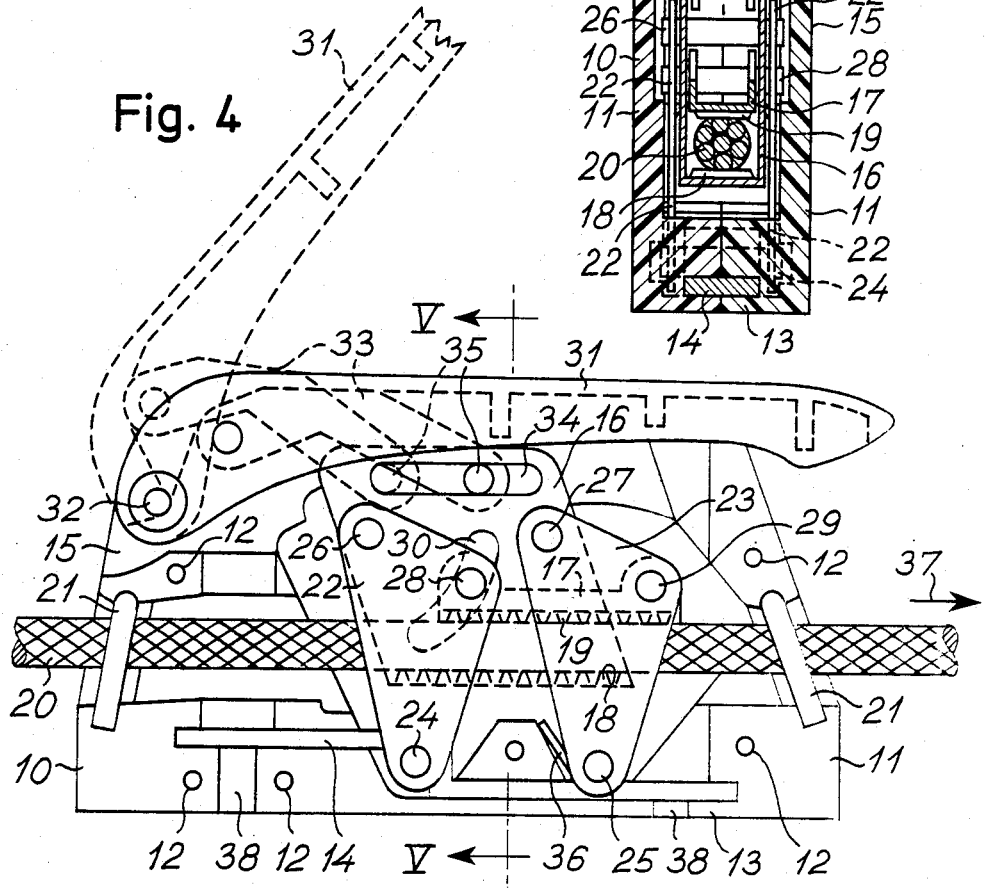
FIG. 4 is a side view corresponding to those shown in FIGS. 1 and 3, but with the gripping device in its rope engaging position.

When a free end of a rope or wire 20 is to be inserted through the rope passageway defined by the guide loops 21 and the oppositely arranged, spaced rope engaging surfaces 18 and 19 as shown in FIG. 3, the operating handle 31 is swung from its inoperative position shown in FIG. 1 to a substantially vertical, operative position shown in FIG. 3. The stud 35 of the connecting link 33 is then brought into engagement with one end (the left end as viewed in FIG. 3) of the slots or cutouts 34, whereby the U-shaped jaw member 16 is moved to the left as viewed in FIG. 3. Because the jaw member 16 is connected to the jaw member 17 and the swinging links or arms 22 and 23, these parts will also be moved to the left, which—as described in more detail below—causes an increase of the spacing between the rope engaging surfaces 18 and 19. The rope 20 may now be passed through the gripping or locking device without any problems. When the rope or wire is to be gripped or locked, the operating handle 31 is moved back to its inoperative starting position, whereby the rope engaging surfaces 18 and 19 are again moved towards each other and into tight engagement with the outer surface of the rope or wire 20 as shown in FIG. 4. A spring member, such as a coil spring 36 arranged around the pivot pin 25 biasses the swinging links 23 clockwise, whereby it tends to press the surfaces 18 and 19 into engagement with the rope 20. When a pulling force is supplied to the rope 20 in the direction directed by an arrow 37 in FIG. 4, the friction between the rope and the surfaces 18 and 19 tends to move the jaw members 16 and 17 in the same direction, whereby the swinging links 22 and 23 tend to swing clockwise. As explained below such swinging movement of the links or arms 22 and 23 causes the mutual spacing of the rope engaging surfaces 18 and 19 to decrease, and the rope engaging surfaces are thereby pressed into still closer engagement with the rope or wire 20. If it is desired to release the rope or wire 20 for a shorter or longer period of time, the operating handle 31 is swung upwards to its operative position as indicated with dotted lines in FIG. 4. However, when the handle is moved back to its horizontal, inoperative position in which it overlays and closes the spacing between the side walls 15 of the frame 10, the rope 20 will immediately be locked.

Figure 2:
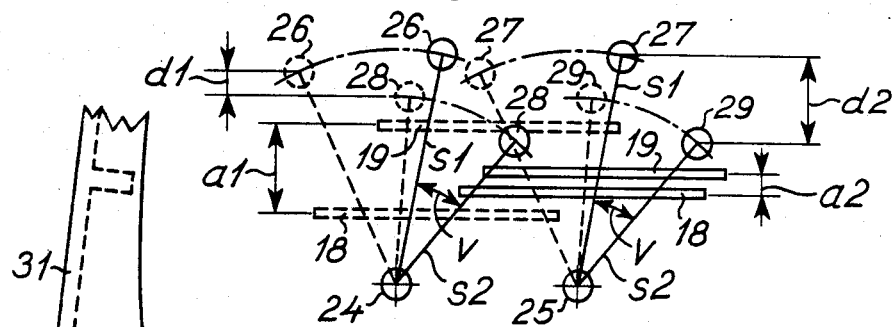

FIG. 2 diagrammatically illustrates the mutual movements of the rope engaging surfaces 18 and 19, when the swinging arms or links 22 and 23 are swung about pivot pins 24 and 25 from a rope releasing position indicated by dotted lines in FIG. 2, to a locking or gripping position shown by solid lines and corresponding to the position shown in FIG. 1. In fact the U-shaped jaw member 16 is suspended by parallel swinging links or arms s1, which are the line sections extending between the pivot pins 24 and 26 and between the pivot pins 25 and 27, respectively. The jaw member 17 is correspondingly suspended by parallel swinging arms or links s2, which are line sections extending between the pivot pins 24 and 28 and between pivot pins 25 and 29, respectively. The arms or links s2 are angularly displaced by an angle v clockwise in relation to the arms or links s1. This means that the rope engaging surfaces 18 and 19 will be moved towards each other when they are pulled to the right (as viewed in FIG. 2) by frictional forces acting on the rope engaging surfaces 18 and 19, when a pulling force (as indicated by the arrow 37 in FIG. 4) is applied to a rope or wire 20 positioned between the surfaces. From FIG. 2 it appears that in the rope releasing position of the gripping device the vertical distance d1 between the pivot pins 26 and 28 is rather small, which means that in this position the mutual spacing a1 of the rope engaging surfaces 18 and 19 is relatively large. When the swinging arms or links 22 and 23 have been swung to the locking or gripping position shown in FIG. 1 and indicated by solid lines in FIG. 2, the vertical distance d1 between the pivot pins 26 and 28 and between the pivot pins 27 and 29 is relatively long, and the mutual vertical spacing a2 of the rope engaging surfaces 18 and 19 is correspondingly small.

In the rope engaging position of the gripping or locking device shown in FIG. 4 the swinging arms or links 22 and 23 preferably occupy such a position that the line segments s1 and s2 are positioned on either side of a vertical line passing through the center of the pivot 24 and the center of the pivot pin 25, respectively. This means that swinging of the arms or links 22 and 23 in a clockwise direction in FIG. 4 due to a pulling force applied to the rope or wire 20 in the direction indicated by the arrow 37 causes an upward movement of the pivot pins 26 and 27 and, consequently, of the rope engaging surface 18, while the pivot pins 28 and 29 and, consequently, also the rope engaging surface are moved downwards, which means that the rope or wire 20 is pinched even harder between the rope engaging surfaces 18 and 19.

Figure 6:
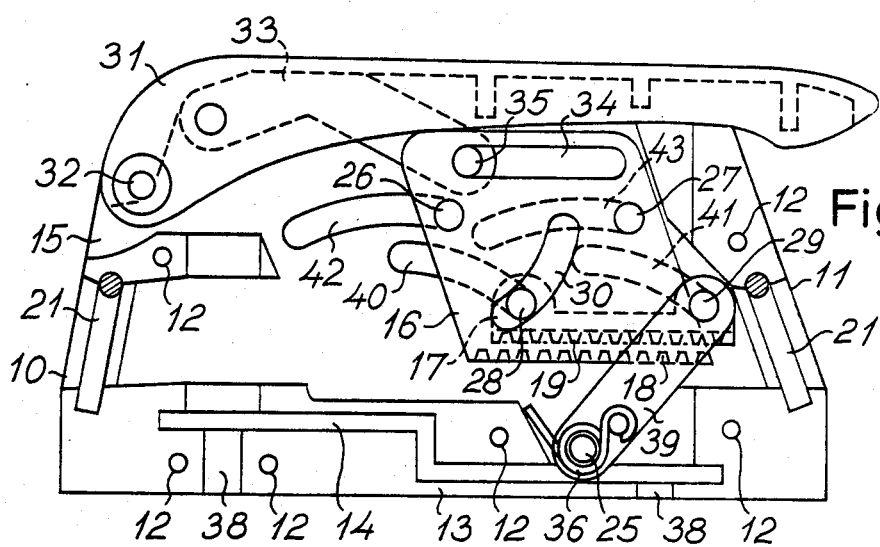
FIG. 6 is a side view corresponding to that shown in FIG. 1 but of a modified embodiment of the gripping device.

FIG. 6 shows an embodiment of the gripping device according to the invention modified in relation to the embodiment described above with reference to FIGS. 1-5. However, in FIG. 6 parts corresponding to parts in the embodiment shown in FIGS. 1-5 have been designated with the same reference numerals. In the embodiment shown in FIG. 6 the two triangular swinging arms or links 22 and 23 have been replaced by a single swinging arm or link 39, and guiding slots or channels formed in the inner side of the oppositely arranged side walls 15 of the frame 10. One end of the swinging link 39 is swingably connected to the pivot pin 25 mounted in the frame 10, and is caused to turn clockwise by the spring 36. The other end of the swinging link 39 is pivotally connected to the rope engaging member or jaw member 17 by means of the pivot pin 29. The free ends of the other pivot pin 28 associated with the jaw member 17 are received in circular-arc-shaped guiding channels 40 formed in the inner surfaces of the oppositely arranged side walls 15 of the frame 10. The free ends of the pivot pin 29 may also be received in such guiding channels 41, if desired. The movement of the U-shaped jaw member 16 in the frame 10 is guided by the free ends of the pivot pins 26 and 28 being received in corresponding pairs of circular-arc-shaped guiding channels 42 and 43, which are formed in the oppositely arranged side walls 15 of the frame. Apart from the modified movable suspension of the jaw members 16 and 17 the embodiment shown in FIG. 6 functions in the same manner as that shown in FIGS. 1-5.

The embodiments of the locking or gripping device described above may be fastened to a suitable supporting surface, such as the deck of a ship, and the gripping device may be fastened by means of screws or bolts, which may be passed through bores 38 formed in the bottom wall 13 of the frame 10.

It should be understood that in the gripping device according to the invention the rope engaging surfaces 18 and 19 may have any area desired. Because the rope engaging surfaces remain substantially parallel, when they are moved towards each other for pinching the rope or wire 20 therebetween, it is possible to obtained a desired small specific pressure between the rope engaging surfaces and the rope, even when the total compressive force is rather high. Thereby the risk of wear and damage of the rope may be reduced. It should be noted that the rope engaging surfaces need not necessarily be plane. As an example, they may have a more or less curved cross-sectional shape. As an example, in a cross-sectional view as that shown in FIG. 5, the rope engaging surfaces may be concavely curved so as to define a substantially tubular rope passageway. Alternatively, only one of the rope engaging surfaces may be concavely curved so as to form a kind of trough for receiving the rope, and the other rope engaging surface may then be substantially plane or convexly curved and serve to press the rope into the trough.

What is claimed is:

1. A gripping device for releasably gripping an elongated flexible member, said device comprising, a frame, first and second engaging members which have a pair of oppositely arranged, generally parallelly extending engaging surfaces defining therebetween a passageway for said flexible member, first and second swinging link suspensions for said first and second engaging members, respectively, said suspensions including at least one pair of substantially parallel arms of equal length having one end thereof mounted pivotally to said frame about fixed first and second pivot axes, respectively, which are mutually spaced in the longitudinal direction of the passageway, the other ends of said arms being pivotally connected to the respective engaging member at pivots which are fixed in relation to said engaging member, and which are spaced corresponding to the spacing of said first and second pivot axes, the arms of the first link suspension having an effective length exceeding the effective length of the arms of the second link suspension, said first and second pivot axes being common to said first and second link suspensions, and connecting means for interconnecting the parallel arms of said first link suspension with the parallel arms of the second link suspension so that a fixed acute angle is defined between each arm of the first link suspension and the corresponding arm of the second link suspension so as to obtain an increased mutual transverse movement of the engaging members between positions in which said flexible member is gripped and released, respectively, by the engaging surfaces, when the link suspensions are swung about said first and second pivot axes, said first engaging member defining a U-shaped channel therein having a bottom surface which defines one of the engaging surfaces, while a part of said second engaging member defining the other rope engaging surface is received in said channel, spring means for biasing the rope engaging members towards their locking position, and an operating handle connected to the engaging member defining said channel, through a linkage comprising a lost motion connection, and by means of which the engaging members may be moved to their releasing position against the bias of the spring means.

2. A device according to claim 1, wherein corresponding arms of said first and second suspension links are formed as an integral part.

3. A gripping device according to claim 1, wherein each link suspension comprises two pairs of oppositely similar arms.

4. A device according to claim 1 wherein in the gripping position of the engaging members, each of the arms of one of said link suspensions is positioned on one side of a plane comprising the associated pivot axis and extending at right angles to the passageway, while the corresponding arm for the other rope engaging member is positioned at the other side of the said plane.

5. A gripping device according to claim 4, wherein the arms of said first link suspension are swung towards said plane when the engaging members are moved towards their gripping position, while the arms of said second link suspension are swung away from said plane.

* * * * *